United States Patent Office 3,518,803
Patented July 7, 1970

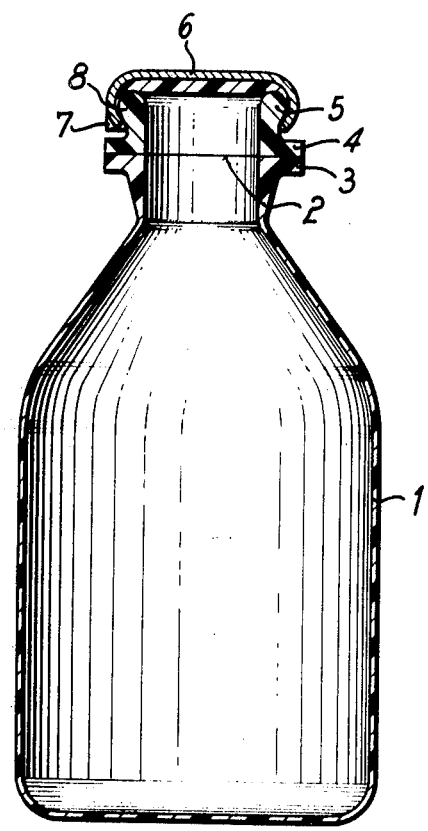

3,518,803
METHOD OF CLOSING A CONTAINER
Dieter Wunderlich, Stuttgart, and Günther Schmid, Stuttgart-Möhringen, Germany, and Johannes G. W. Biel, deceased, late of Neuffen, Germany, by Karl Ischinger, executor, Nurtingen, Germany, assignors to Robert Bosch G.m.b.H., Stuttgart, Germany
Filed July 19, 1968, Ser. No. 746,713
Claims priority, application Germany, Aug. 17, 1967,
B 94,015
Int. Cl. B65b 7/28; B67b 5/00
U.S. Cl. 53—29                                    5 Claims

ABSTRACT OF THE DISCLOSURE

A method of affixing by pressure a cover to the neck of a container whose wall thickness is insufficient to withstand the requisite pressure. The thin-walled container is provided with an opening. A neck for the container is made separately and given a wall thickness capable of withstanding the pressure required for securing the cover thereto. A cover is affixed to one open end of the neck by pressure connection. The other open end of the neck is welded to the thin-walled container in registry with the opening therein.

BACKGROUND OF THE INVENTION

The present invention relates generally to the closing of containers, and more particularly to a method of closing a container. Still more particularly the invention relates to a method of closing thin-walled containers.

Certain containers are made with very thin walls, such as containers consisting of thermoplastic material. In many cases containers of this type are to be closed with pressure-applied covers of the type which generally finds use on soft-drink bottles, beer bottles and similar containers. However, these covers are applied with a certain pressure and the thin walls of such containers frequently are incapable of withstanding such pressure and will either become damaged or at least yield elastically, thus making it impossible for the machinery utilized to properly affix the cover.

It is a general object of the present invention to overcome this disadvantage and to make it possible to affix covers of this type to thin-walled containers, particularly bottles and other containers consisting of synthetic plastic material in general and thermoplastic material in particular.

SUMMARY OF THE INVENTION

In accordance with one feature of our invention we provide a method of sealingly pressure-affixing a cover to the neck of a container having a wall thickness insufficient to withstand the requisite pressure. This method comprises the steps of making a thin-walled container having an opening but no neck. The neck is made separately so that it can be secured to the container in registry with the opening of the latter; the neck has a first and a second open end and a wall thickness sufficient to withstand a predetermined pressure corresponding to the pressure required for sealingly affixing the cover to the neck. The aforementioned cover is then pressure-affixed to one open end of the neck so as to seal this open end, and the thus connected neck and cover are fluid-tightly united with the container so that the other open end of the neck is in registry with the opening in the latter. Such uniting can advantageously be accomplished, if the material is weldable as is particularly the case in the event thermoplastic material is used, by a welding process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection wiht the accompanying drawing.

BRIEF DESCRIPTION OF THE DRAWING

The single figure illustrates in partly diagrammatic and partly vertically sectioned view a container embodying the present invention.

DESCRIPTION OF THE PREFERRED EMBODIMENTS

The container illustrated in the drawing is generally identified with reference numeral 1 and is here assumed to be in the form of a bottle, although other forms obviously will also be suitable. The container is assumed to consist of a thermoplastic material, for instance polyethylene, polypropylene, polyvinyl chloride or the like and may advantageously be blow molded. It has a wall thickness which is too thin to withstand significant pressure of the magnitude necessary to affix the cover 6.

According to the present invention the opening for introducing and withdrawing material from the interior of the container 1, which opening is identified with reference numeral 2, is bounded by a radially extending flange 3 having a thickness significantly greater than that of the wall thickness of the remainder of the container 1. A neck 5, whose wall thickness is much greater than the wall thicknesss of the container 1 and which is thus able to withstand the requisite pressure needed to affix the cover 6, is produced separately in suitable manner, and the neck 5 is provided with another flange 4. The neck 5 is further provided with an annular bead 8. A cover 6 of well known type is pressure-affixed to the neck 5 in conventional manner, that is it is placed in position on the outlet end of the neck 5 and is subjected to such pressure as is needed to secure it to the neck 5. As the drawing shows, the free marginal portion of the cover 6 is provided with ribs 7 which embrace the bead 8 in conventional manner.

According to the present invention the bottle 1 is filled in usual manner and the cover 6 is affixed to the neck 5, also in usual manner. Thereupon, the unit consisting of the neck 5 and the cover 6 is fluid-tightly secured to the bottle or container 1, in the illustrated embodiment by placing the flanges 3 and 4 into abutting engagement as shown in the drawing, and then welding them to one another in conventional manner by resorting to a welding-mirror process, a contact-welding process, an ultrasonic welding process or another suitable expedient. Of course, the units consisting of neck 5 and cover 6 may be assembled and kept in stock so as to be withdrawn from stock and secured to the bottle or container 1 whenever the need arises, rather than being connected to one another at the time at which they are required.

If the packaging of the contents of the bottle or container 1 is to be sterile, one unit consisting of a neck 5 and a cover 6 may be sterilized and then secured to the associated container 1 in the manner just outlined. However, it is also possible and in fact advantageous to effect sterilization of several such units simultaneously, advantageously by placing them into a closed receptacle, sterilizing them therein, and then welding them in a sterilized welding compartment of the respective filled container 1 which has already been sterilized itself, together with its contents.

It will be obvious that other materials than those set forth are suitable for the purpose of the invention, just as it will be obvious that the construction of the various components shown in the drawing may differ from what is illustrated, and that variations in the sequence of method steps are conceivable without departing from the concept of the present invention.

It will be understood that each of the elements described above, or two or more together, may also find a useful application in other types of applications differing from the types described above.

While the invention has been illustrated and described as embodied in a method for closing a container, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A method of sealingly pressure-affixing a cover to the neck of a container having a wall thickness insufficient to withstand the requisite pressure, comprising the steps of making a thin-walled container having an opening; making a neck adapted to be secured to said container in registry with said opening and having a first and a second open end and a wall thickness sufficient to withstand a predetermined pressure; pressure-affixing to the first open end of the neck a cover which seals said first open end; and fluid-tightly uniting said second open end of the neck with said container in registry with said opening of the latter.

2. A method as defined in claim 1, wherein said neck and said conainer consists of weldable material, and wherein the step of uniting the neck with the container comprises welding the same together.

3. A method as defined in claim 1, wherein said neck and said container consists of weldable synthetic plastic material, and wherein the step of uniting the neck with the container comprises welding the same together.

4. A method as defined in claim 1; and further comprising the step of sterilizing said neck with the cover affixed thereto prior to uniting said container and said neck.

5. A method as defined in claim 1, comprising the step of repeating steps one through three at least once with a different neck, a different cover and a different container; and further comprising the steps of placing both necks with the respective covers affixed thereto into a closed receptacle, and jointly sterilizing them therein prior to uniting the necks and the respective covers affixed thereto with their associated containers.

References Cited

UNITED STATES PATENTS 2,099,055  11/1937  Ferngren _____ 53—39 XR
3,401,498  9/1968  Garvin _____ 53—41

THERON E. CONDON, Primary Examiner

R. L. SPRUILL, Assistant Examiner

U.S. Cl. X.R.

53—39, 41; 215—1, 31